US010196978B2

(12) United States Patent
Tanimura et al.

(10) Patent No.: US 10,196,978 B2
(45) Date of Patent: Feb. 5, 2019

(54) SUNLIGHT-UTILIZING GAS TURBINE POWER GENERATION SYSTEM PROVIDED WITH HYDROGEN-GENERATING UNIT

(71) Applicants: KAWASAKI JUKOGYO KABUSHIKI KAISHA, Hyogo (JP); B&B AGEMA GmbH, Aachen (DE)

(72) Inventors: Kazuhiko Tanimura, Akashi (JP); Takao Sugimoto, Kobe (JP); Karsten Kusterer, Moresnet (BE)

(73) Assignees: KAWASAKI JUKOGYO KABUSHIKI KAISHA, Kobe-shi, Hyogo (JP); B&B AGEMA GmbH, Aachen (DE)

( * ) Notice: Subject to any disclaimer, the term of this patent is extended or adjusted under 35 U.S.C. 154(b) by 753 days.

(21) Appl. No.: 14/695,192

(22) Filed: Apr. 24, 2015

(65) Prior Publication Data

US 2015/0226119 A1 Aug. 13, 2015

Related U.S. Application Data

(63) Continuation of application No. PCT/JP2013/078168, filed on Oct. 17, 2013.

(30) Foreign Application Priority Data

Oct. 26, 2012 (JP) .................................. 2012-236377

(51) Int. Cl.
*F02C 3/22* (2006.01)
*F02C 1/05* (2006.01)
(Continued)

(52) U.S. Cl.
CPC ................. *F02C 3/22* (2013.01); *F02C 1/05* (2013.01); *F02C 3/04* (2013.01); *F02C 6/00* (2013.01);
(Continued)

(58) Field of Classification Search
CPC . C01B 3/042; C01B 3/045; F02C 1/05; F02C 3/04; F02C 3/22; F02C 6/00;
(Continued)

(56) References Cited

U.S. PATENT DOCUMENTS 6,630,119 B1 * 10/2003 Sugie .................. C01B 3/042
423/658.2
8,272,216 B2 * 9/2012 Nakamura .............. C01B 3/042
123/3
(Continued)

FOREIGN PATENT DOCUMENTS

CN 101027524 A 8/2007
GB 2449181 A 11/2008
(Continued)

OTHER PUBLICATIONS

Communication dated Feb. 26, 2016 from the Canadian Intellectual Property Office in counterpart application No. 2,889,491.
(Continued)

*Primary Examiner* — William H Rodriguez
*Assistant Examiner* — Jason H Duger
(74) *Attorney, Agent, or Firm* — Sughrue Mion, PLLC (57) ABSTRACT

A power generation system having a gas turbine engine that utilizes sunlight, includes a compressor configured to compress an air which is a working medium, a solar heater configured to heat the air compressed by the compressor, utilizing sunlight as a heat source, a hydrogen combustor configured to burn the air compressed by the compressor utilizing hydrogen as a fuel, a turbine configured to output a motive power from a high-temperature gas heated by at least one of the solar heater and the hydrogen combustor, a power generator configured to be driven by the turbine, and at least one hydrogen-generating unit configured to generate hydrogen by utilizing an output of the turbine or exhaust
(Continued)

heat from the turbine to decompose a water, and supply the hydrogen so generated to the hydrogen combustor.

3 Claims, 3 Drawing Sheets

(51) Int. Cl.

| | | |
|---|---|---|
| F02C 6/10 | (2006.01) | |
| F24S 90/00 | (2018.01) | |
| F02C 6/18 | (2006.01) | |
| F02C 7/08 | (2006.01) | |
| F02C 7/22 | (2006.01) | |
| F03G 6/04 | (2006.01) | |
| F02C 3/04 | (2006.01) | |
| F02C 6/00 | (2006.01) | |
| F02C 7/32 | (2006.01) | |

(52) U.S. Cl.
CPC ............ *F02C 6/10* (2013.01); *F02C 6/18* (2013.01); *F02C 7/08* (2013.01); *F02C 7/22* (2013.01); *F02C 7/32* (2013.01); *F03G 6/04* (2013.01); *F24S 90/00* (2018.05); *F05D 2220/32* (2013.01); *F05D 2220/60* (2013.01); *F05D 2260/20* (2013.01); *Y02E 10/46* (2013.01)

(58) Field of Classification Search
CPC ...... F02C 6/10; F02C 6/14; F02C 6/18; F02C 7/08; F02C 7/22; F02C 7/32; F05D 2220/60; F05D 2260/20; F03G 6/04; Y02E 10/46; F24J 2/42; F24S 90/00
USPC .................................................. 423/657, 658
See application file for complete search history.

(56) References Cited

U.S. PATENT DOCUMENTS

| | | | |
|---|---|---|---|
| 8,359,861 B2 | 1/2013 | Tamaura et al. | |
| 8,881,528 B2* | 11/2014 | Gericke | ............... F02C 1/06 60/39.182 |
| 2006/0053792 A1 | 3/2006 | Bourgeois | |
| 2009/0173337 A1 | 7/2009 | Tamaura et al. | |
| 2009/0261590 A1 | 10/2009 | Aritaka | |

FOREIGN PATENT DOCUMENTS

| | | | |
|---|---|---|---|
| JP | 7-332023 A | 12/1995 | |
| JP | 2004-324626 A | 11/2004 | |
| JP | 2005-54582 A | 3/2005 | |
| JP | 2005-264800 A | 9/2005 | |
| JP | 2007-211692 A | 8/2007 | |
| JP | 2010-275996 A | 12/2010 | |
| JP | 2011-32960 A | 2/2011 | |
| JP | 2012-177352 A | 9/2012 | |
| WO | 2006/025449 A1 | 3/2006 | |
| WO | 2006/064719 A1 | 6/2006 | |

OTHER PUBLICATIONS

Communication dated Jun. 28, 2016, from the European Patent Office in counterpart European Application No. 13848381.3.
International Preliminary Report of Patentability dated May 7, 2015, issued by the International Bureau of WIPO in counterpart International Application No. PCT/JP2013/078168.
JPO Office Action for Application No. 2012-236377 dated Sep. 3, 2013.
International Search Report for PCT/JP2013/078168 dated Nov. 12, 2013 [PCT/ISA/210].

* cited by examiner

Fig. 3

SUNLIGHT-UTILIZING GAS TURBINE POWER GENERATION SYSTEM PROVIDED WITH HYDROGEN-GENERATING UNIT

CROSS REFERENCE TO THE RELATED APPLICATION

This application is a continuation application, under 35 U.S.C. § 111(a), of international application No. PCT/JP2013/078168, filed Oct. 17, 2013, which claims priority to Japanese patent application No. 2012-236377, filed Oct. 26, 2012, the disclosure of which are incorporated by reference in their entirety into this application.

BACKGROUND OF THE INVENTION

1. Field of the Invention

The present invention relates to a gas turbine power generation system which generates power by utilizing sunlight as a heat source.

2. Description of Related Art

In recent years, as one solution for the environmental issues and energy issues, the technique to generate power by a turbine device which utilizes sunlight as a heat source, for example, a gas turbine power generation system which utilizes the heat of sunlight, has been proposed (e.g., see Patent Document 1).

RELATED ART DOCUMENT

Patent Document

[Patent Document 1] JP Laid-open Patent Publication No. 2011-032960

SUMMARY OF THE INVENTION

However, in general, such a facility which utilizes sunlight cannot control a supply amount of sunlight which is an energy source, and thus it is difficult to supply power appropriately corresponding to a change in demand for power. Therefore, there is the problem that while surplus power occurs during the daytime when a power demand is low with respect to an amount of insolation, power cannot be supplied during the nighttime or under bad weather.

Therefore, in order to solve the above-described problem, an object of the present invention is to provide a gas turbine power generation system which is able to perform power supply corresponding to an increase or decrease in power demand while utilizing sunlight as a heat source.

In order to achieve the above-described object, a gas turbine power generation system according to the present invention is a power generation system having a gas turbine engine that utilizes sunlight. The power generation system includes: a compressor configured to compress an air which is a working medium; a solar heater configured to heat the air compressed by the compressor, utilizing sunlight as a heat source; a hydrogen combustor configured to burn the air compressed by the compressor, utilizing hydrogen as a fuel; a turbine configured to output a motive power from a high-temperature gas heated by at least one of the solar heater and the hydrogen combustor; a power generator configured to be driven by the turbine; and at least one hydrogen-generating unit configured to generate hydrogen by utilizing an output of the turbine or exhaust heat from the turbine to decompose water, and supply the hydrogen so generated to the hydrogen combustor.

According to this configuration, when an amount of insolation is large and a power demand is low, hydrogen is generated by the hydrogen-generating unit and stored, and when a power demand is high or during the nighttime when there is no sunlight, an amount of supplied power can be increased by utilizing the hydrogen that has been stored. Thus, it is possible to perform power supply corresponding to an increase or decrease in power demand while utilizing sunlight as a heat source.

In one embodiment of the present invention, the hydrogen-generating unit may be an electrolysis hydrogen-generating unit configured to perform electrolysis of a water by utilizing a power generated by the power generator. According to this configuration, it is possible to perform power supply corresponding to an increase or decrease in power demand by effectively utilizing surplus power generated when an amount of insolation is large with respect to power demand.

In one embodiment of the present invention, the gas turbine power generation system may further include a pyrolysis hydrogen-generating unit configured to generate hydrogen by pyrolysis of a water by utilizing an exhaust gas from the turbine. According to this configuration, by further utilizing exhaust heat from the gas turbine engine, it is possible to perform power supply corresponding to an increase or decrease in power demand while the efficiency of the entire system is increased.

In one embodiment of the present invention, the gas turbine power generation system may further include a compressed air preheating path configured to preheat the air compressed by the compressor, utilizing heat generated in the pyrolysis hydrogen-generating unit. In this case, further, the compressed air preheating path may be provided with a mechanism to switch a flow path in response to interchanging of a reaction chamber in which an endothermic reaction is conducted with a reaction chamber in which an exothermic reaction is conducted, in the pyrolysis hydrogen-generating unit, such that the flow path extends near the reaction chamber in which the exothermic reaction is conducted. According to this configuration, it is possible to improve the efficiency of the entire system by effectively utilizing heat generated in the pyrolysis reaction.

In one embodiment of the present invention, the gas turbine power generation system may further include an exhaust gas heat exchange path configured to cause the exhaust gas from the turbine to pass therethrough to exchange heat between the exhaust gas and the pyrolysis hydrogen-generating unit, and the exhaust gas heat exchange path has a mechanism to switch a flow path in response to interchanging of a reaction chamber in which an endothermic reaction is conducted with a reaction chamber in which an exothermic reaction is conducted, in the pyrolysis hydrogen-generating unit, such that the flow path extends near the reaction chamber in which the endothermic reaction is conducted. According to this configuration, it is possible to improve the efficiency of the entire system by effectively utilizing the heat of the exhaust gas from the turbine.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
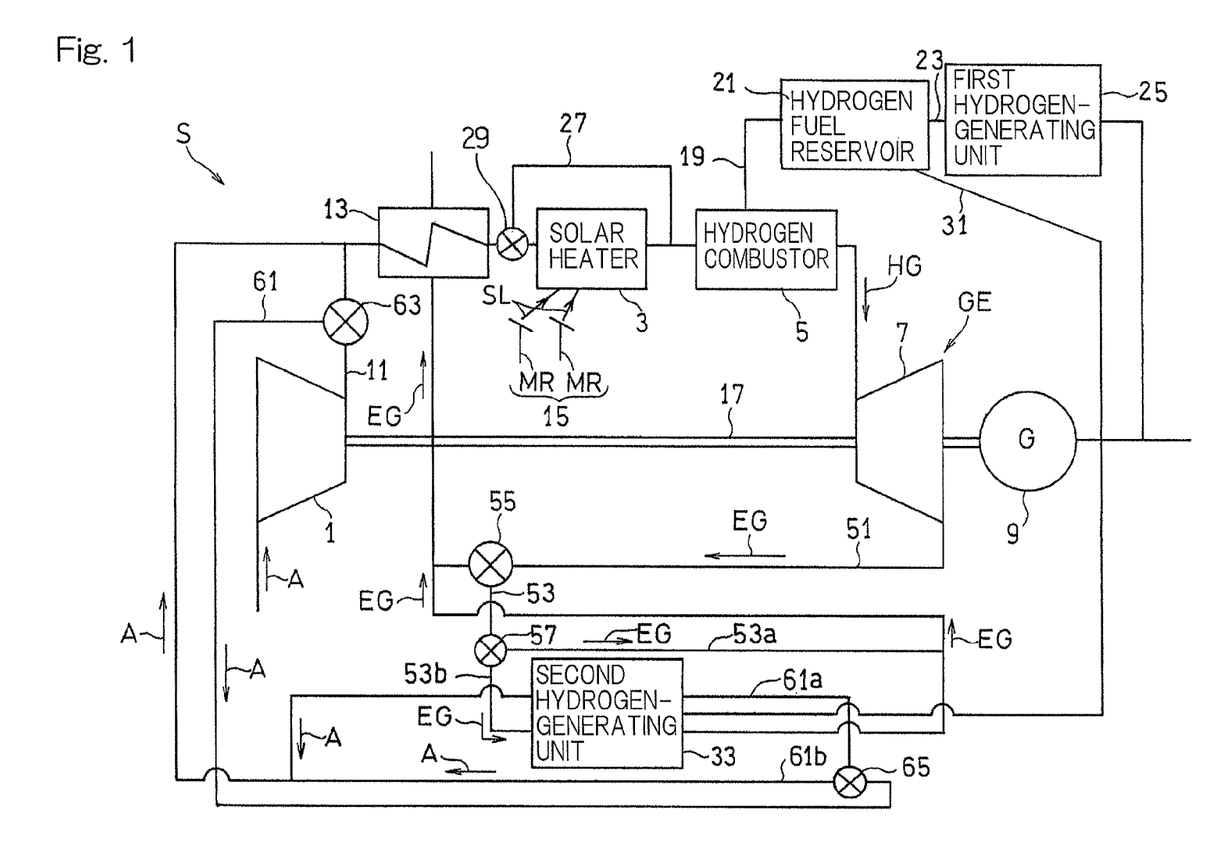
FIG. 1 is a block diagram showing a schematic configuration of a gas turbine power generation system according to one embodiment of the present invention.

Hereinafter, embodiments of the present invention will be described with reference to the drawings. FIG. 1 is a schematic configuration diagram showing a gas turbine power generation system (hereinafter, simply referred to as "power generation system") S according to one embodiment of the present invention. The power generation system S includes a gas turbine engine GE which utilizes sunlight. That is, the power generation system S includes a compressor 1 for compressing an air A which is a working medium, a solar heater 3 and a hydrogen combustor 5 both for heating the air A compressed by the compressor 1, and a turbine 7 for outputting motive power from the compressed and heated air A. In the present embodiment, the power generation system S is configured as a regenerative cycle engine which supplies the air A discharged from the turbine 7, to the compressor 1 for reusing. A power generator 9 which is a load is driven by an output of the gas turbine engine GE.

The air A compressed by the compressor 1 passes through a regenerator 13 via a compressed air supply path 11 and then is sent to the solar heater 3. The regenerator 13 utilizes heat of a high-temperature exhaust gas EG discharged from the turbine 7, to preheat the air A flowing from the compressor 1 toward the solar heater 3 and the hydrogen combustor 5.

The solar heater 3 which is disposed between the compressor 1 and the turbine 7 receives sunlight SL supplied from a sunlight condensing device 15 which is provided outside the power generation system S, and heats the air A utilizing the sunlight SL as a heat source. In the present embodiment, multiple mirrors MR adjustable in angle so as to condense light toward the solar heater 3 are used as the sunlight condensing device 15.

The hydrogen combustor 5 which burns the air A with hydrogen as a fuel is provided between the solar heater 3 and the turbine 7. The high-temperature and high-pressure air A supplied from the solar heater 3 or the hydrogen combustor 5 drives the turbine 7 and then is discharged as a high-temperature and low-pressure exhaust gas EG from the turbine 7. The turbine 7 is connected to the compressor 1 via a rotary shaft 17. The compressor 1 and the power generator 9 are driven by the turbine 7 via the rotary shaft 17.

The hydrogen combustor 5 is connected to a hydrogen fuel reservoir 21 via a hydrogen fuel supply path 19 and is supplied with a hydrogen fuel from the hydrogen fuel reservoir 21. The hydrogen fuel reservoir 21 is connected to a first hydrogen-generating unit 25 via a first hydrogen introduction path 23. The first hydrogen-generating unit 25 is configured as an electrolysis hydrogen-generating unit which generates hydrogen by electrolysis of a water. The first hydrogen-generating unit 25 is supplied with power required for the electrolysis, from the power generator 9 which is driven by the turbine 7. A bypass path 27 which bypasses the compressed air A from the solar heater 3 as necessary, and a bypass switching valve 29 which switches a flow path to the bypass path 27 are provided between the regenerator 13 and the hydrogen combustor 5 on the compressed air supply path 11.

The hydrogen fuel reservoir 21 is also connected to a second hydrogen-generating unit 33 via a second hydrogen introduction path 31. The second hydrogen-generating unit 33 is configured as a pyrolysis hydrogen-generating unit which generates hydrogen by pyrolysis of water. The second hydrogen-generating unit 33 utilizes the heat of the high-temperature exhaust gas EG discharged from the turbine 7, as a heat source required for the pyrolysis. The second hydrogen-generating unit 33 according to the shown example utilizes a so-called UT-3 process as a pyrolysis process for hydrogen.

The UT-3 process is composed of the following four reactions using compounds of calcium, iron, bromine, and the like as process circulation substances.

$$CaBr_2 + H_2O \rightarrow CaO + 2HBr \tag{1-A}$$

$$CaO + Br_2 \rightarrow CaBr_2 + \tfrac{1}{2}O_2 \tag{1-B}$$

$$Fe_3O_4 + 8HBr \rightarrow 3FeBr_2 + 4H_2O + Br_2 \tag{2-A}$$

$$3FeBr_2 + 4H_2O \rightarrow Fe_3O_4 + 6HBr + H_2 \tag{2-B}$$

First, at a temperature of about 730° C., calcium bromide and water vapor are reacted by reaction (1-A) to generate hydrogen bromide gas and calcium oxide. The calcium oxide is reacted with bromine at a temperature of about 500° C. by reaction (1-B) to regenerate calcium bromide and generate oxygen. Meanwhile, iron bromide is reacted with water vapor at a temperature of about 600° C. by reaction (2-B) to obtain hydrogen bromide gas and iron oxide and generate hydrogen. The iron oxide is reacted with the hydrogen bromide gas at a temperature of about 350° C. by reaction (2-A) to regenerate bromine and iron bromide. All of these reactions are reactions of solids and gases. The two hydrolysis reactions (1-A) and (2-B) which react a bromide with water vapor are endothermic reactions, and the other reactions (1-B) and (2-A) are exothermic reactions.

Figure 2:
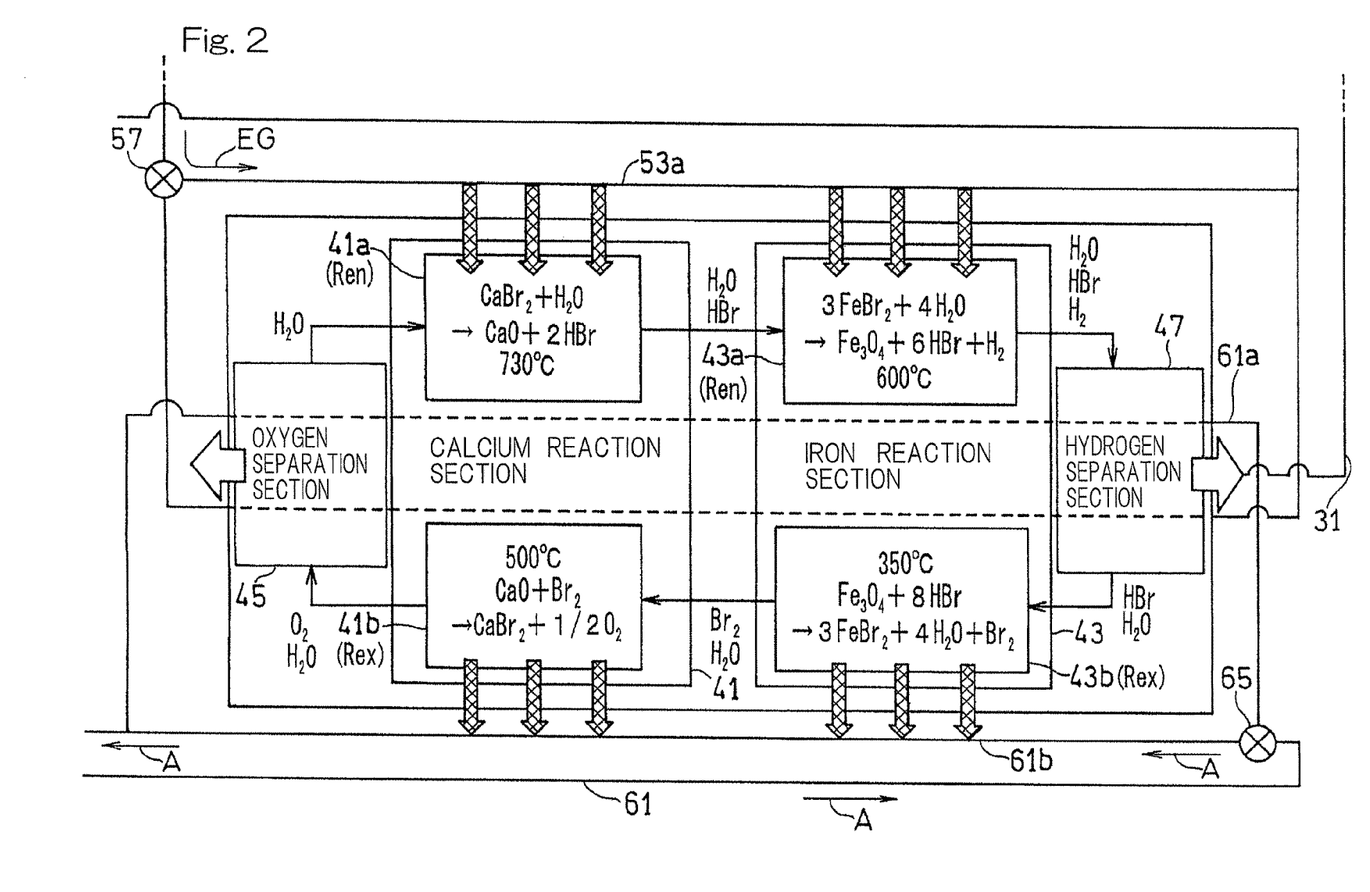
FIG. 2 is a block diagram showing a schematic configuration of a second hydrogen-generating unit (first phase) of the embodiment of FIG. 1 in an enlarged manner.

The second hydrogen-generating unit 33 includes, as schematically shown in FIG. 2, a calcium reaction section 41, an iron reaction section 43, an oxygen separation section 45, and a hydrogen separation section 47. In the calcium reaction section 41, the above reactions (1-A) and (1-B), which use a calcium compound, are conducted. In the iron reaction section 43, the above reactions (2-A) and (2-B), which use an iron compound, are conducted. In the oxygen separation section 45, oxygen that has been generated by the reaction (1-B) in the calcium reaction section 41 is separated and taken out. In the hydrogen separation section 47, hydrogen that has been generated by the reaction (2-B) in the iron reaction section 43 is separated and taken out.

The calcium reaction section 41 includes two reaction chambers (a first calcium reaction chamber 41a and a second calcium reaction chamber 41b), one of the above reactions (1-A) and (1-B) is conducted in the first calcium reaction chamber 41*a*, and the other reaction is conducted in the second calcium reaction chamber 41*b*. Similarly, the iron reaction section 43 includes two reaction chambers (a first iron reaction chamber 43*a* and a second iron reaction chamber 43*b*), one of the above reactions (2-A) and (2-B) is conducted in the first iron reaction chamber 43*a*, and the other reaction is conducted in the second iron reaction chamber 43*b*. These reaction chambers are arranged such that: the reaction chambers in which the endothermic reactions of the above reactions (1-A) and (1-B), which use a calcium compound, and the above reactions (2-A) and (2-B), which use an iron compound, are conducted are adjacent to each other; and the reaction chambers in which the exothermic reactions of the above reactions (1-A) and (1-B) and the above reactions (2-A) and (2-B) are conducted are adjacent to each other. Specifically, in the shown example, the first calcium reaction chamber 41*a* and the first iron reaction chamber 43*a* are arranged adjacent to each other, and the second calcium reaction chamber 41*b* and the second iron reaction chamber 43*b* are arranged adjacent to each other. The endothermic reactions are conducted in the first calcium reaction chamber 41*a* and the first iron reaction chamber 43*a*, which are adjacent to each other, to form an endothermic reaction region Ren, and the exothermic reactions are conducted in the second calcium reaction chamber 41*b* and the second iron reaction chamber 43*b*, which are adjacent to each other, to form an exothermic reaction region Rex (hereinafter, this state is referred to as a first phase).

Figure 3:
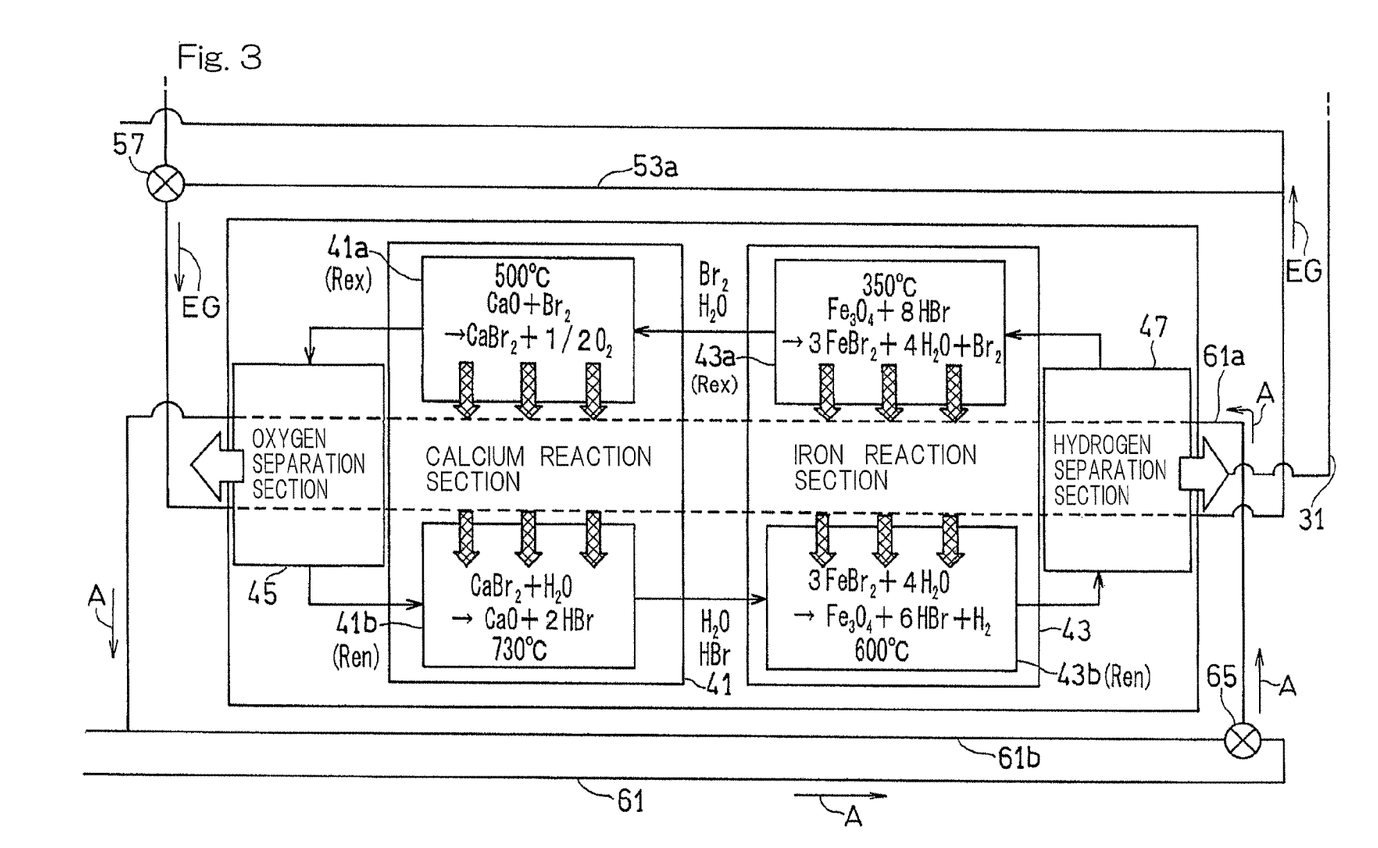
FIG. 3 is a block diagram showing a schematic configuration of the second hydrogen-generating unit (second phase) of the embodiment of FIG. 1 in an enlarged manner.

Understandably, as the pyrolysis hydrogen generation reaction progresses, in the calcium reaction section 41, $CaBr_2$ in the first calcium reaction chamber 41*a* changes to CaO, and CaO in the second calcium reaction chamber 41*b* changes to $CaBr_2$. Thus, the compositions in both reaction chambers 41*a* and 41*b* are interchanged with each other. Similarly, also in the iron reaction section 43, $FeBr_2$ in the first iron reaction chamber 43*a* changes to $Fe_3O_4$, and $Fe_3O_4$ in the second iron reaction chamber 43*b* changes to $FeBr_2$. Thus, the compositions in both reaction chambers 43*a* and 43*b* are interchanged with each other. Therefore, in the present embodiment, after a certain period of time, a direction in which the reaction gases flow within the second hydrogen-generating unit 33 is reversed as shown in FIG. 3, so that the endothermic reaction (1-A) which has been conducted in the first calcium reaction chamber 41*a* and the exothermic reaction (1-B) which has been conducted in the second calcium reaction chamber 41*b* are interchanged with each other and the endothermic reaction (2-B) which has been conducted in the first iron reaction chamber 43*a* and the exothermic reaction (2-A) which has been conducted in the second iron reaction chamber 43*b* are interchanged with each other. That is, after the certain period of time, the exothermic reactions are conducted in the first calcium reaction chamber 41*a* and the first iron reaction chamber 43*a*, which are adjacent to each other, to form the exothermic reaction region Rex, and the endothermic reactions are conducted in the second calcium reaction chamber 41*b* and the second iron reaction chamber 43*b*, which are adjacent to each other, to form the endothermic reaction region Ren (hereinafter, this state is referred to as a second phase). Also, thereafter, the reaction chambers which form the endothermic reaction region Ren and the reaction chambers which form the exothermic reaction region Rex are interchanged with each other at certain time intervals to alternately repeat the first phase and the second phase.

Next, a structure to exchange heat between the gas turbine engine GE and the second hydrogen-generating unit 33 will be described. As shown in FIG. 1, an exhaust gas heat exchange path 53 for exchanging heat between the exhaust gas EG and the second hydrogen-generating unit 33 is provided so as to branch from a middle portion of an exhaust gas path 51 through which the high-temperature exhaust gas EG is discharged from the turbine 7. An exhaust gas flow path switching valve 55 which switches a flow path for the exhaust gas EG between the exhaust gas path 51 and the exhaust gas heat exchange path 53 is provided at the branch point between the exhaust gas path 51 and the exhaust gas heat exchange path 53. The exhaust gas heat exchange path 53 branches at a middle portion thereof into a first endothermic reaction side heat exchange path 53*a* and a second endothermic reaction side heat exchange path 53*b*. A heat exchange flow path switching valve 57 is provided at the branch point between the first endothermic reaction side heat exchange path 53*a* and the second endothermic reaction side heat exchange path 53*b*.

In addition, a compressed air preheating path 61 for preheating the compressed air A by heat generated in the second hydrogen-generating unit 33 is provided so as to branch from a middle portion of the compressed air supply path 11. A compressed air flow path switching valve 63 which switches a flow path for the compressed air A between the compressed air supply path 11 and the compressed air preheating path 61 is provided at the branch point between the compressed air supply path 11 and the compressed air preheating path 61. The compressed air preheating path 61 branches at a middle portion thereof into a first exothermic reaction side compressed air preheating path 61*a* and a second exothermic reaction side compressed air preheating path 61*b*. A compressed air preheating path switching valve 65 is provided at the branch point between the first exothermic reaction side compressed air preheating path 61*a* and the second exothermic reaction side compressed air preheating path 61*b*.

As shown in FIG. 2, the first endothermic reaction side heat exchange path 53*a* and the second exothermic reaction side compressed air preheating path 61*b* extend near the first calcium reaction chamber 41*a* of the calcium reaction section 41 and the first iron reaction chamber 43*a* of the iron reaction section 43 of the second hydrogen-generating unit 33. The second endothermic reaction side heat exchange path 53*b* and the first exothermic reaction side compressed air preheating path 61*a* extend near the second calcium reaction chamber 41*b* of the calcium reaction section 41 and the second iron reaction chamber 43*b* of the iron reaction section 43 of the second hydrogen-generating unit 33.

In the first phase shown in FIG. 2, the above reaction (1-A), which is an endothermic reaction, is conducted in the first calcium reaction chamber 41*a*, the above reaction (2-B), which is an endothermic reaction, is conducted in the first iron reaction chamber 43*a*, the above reaction (1-B), which is an exothermic reaction, is conducted in the second calcium reaction chamber 41*b*, and the above reaction (2-A), which is an exothermic reaction, is conducted in the second iron reaction chamber 43*b*. In this state, the heat exchange flow path switching valve 57 on the exhaust gas heat exchange path 53 is switched to the side of the first endothermic reaction side heat exchange path 53*a* extending near the endothermic reaction region Ren, and the compressed air flow path switching valve 63 on the compressed air preheating path 61 is switched to the side of the first exothermic reaction side compressed air preheating path 61*a* extending near the exothermic reaction region Rex.

Meanwhile, in the second phase shown in FIG. 3, the heat exchange flow path switching valve 57 on the exhaust gas heat exchange path 53 is switched to the side of the second endothermic reaction side heat exchange path 53b, and the compressed air flow path switching valve 63 on the compressed air preheating path 61 is switched to the side of the second exothermic reaction side compressed air preheating path 61b.

In any of the first phase and the second phase, the arrangements of the respective reaction chambers within the endothermic reaction region Ren and the exothermic reaction region Rex are preferably set such that energy loss in heat exchange between the exhaust gas EG and the compressed air A is minimized. That is, within the endothermic reaction region Ren where heat is received from the exhaust gas EG, the reaction chambers are arranged from the upstream side toward the downstream side in flow of the exhaust gas EG in order of the reaction chamber in which the higher temperature reaction is conducted and the reaction chamber in which the lower temperature reaction is conducted (in order of the first calcium reaction chamber 41a in which the reaction temperature is about 730° C. and the first iron reaction chamber 43a in which the reaction temperature is about 600° C. in the example of the present embodiment); and within the exothermic reaction region Rex where heat is provided to the compressed air A, the reaction chambers are arranged from the upstream side toward the downstream side in flow of the compressed air A in order of the reaction chamber in which the lower temperature reaction is conducted and the reaction chamber in which the higher temperature reaction is conducted (in order of the second iron reaction chamber 43b in which the reaction temperature is about 350° C. and the second calcium reaction chamber 41b in which the reaction temperature is about 500° C. in the example of the present embodiment).

Next, an operation of the power generation system S configured as described above will be described. As shown in FIG. 1, during a period of time when a power demand is low, hydrogen is generated by the first and second hydrogen-generating units 25 and 33 utilizing surplus power generated by the power generator 9 and the heat of the exhaust gas EG from the turbine 7. When the second hydrogen-generating unit 33 is activated, the exhaust gas flow path switching valve 55 is switched to the side of the exhaust gas heat exchange path 53 to supply the exhaust gas EG to the exhaust gas heat exchange path 53, and the compressed air flow path switching valve 63 is switched to the side of the compressed air preheating path 61 to supply the compressed air A to the compressed air preheating path 61.

In the second hydrogen-generating unit 33, as the reactions of the pyrolysis reaction process progress, the endothermic reactions and the exothermic reactions are interchanged between the two reaction chambers 41a and 41b of the calcium reaction section 41 and between the two reaction chambers 43a and 43b of the iron reaction section 43 as described above. In the first phase in which the endothermic reactions progress in the first calcium reaction chamber 41a and the first iron reaction chamber 43a adjacent thereto, the heat exchange flow path switching valve 57 on the exhaust gas heat exchange path 53 is switched to the side of the first endothermic reaction side heat exchange path 53a to cause the exhaust gas EG to flow near the first calcium reaction chamber 41a and the first iron reaction chamber 43a, and the compressed air preheating path switching valve 65 on the compressed air preheating path 61 is switched to the side of the first exothermic reaction side compressed air preheating path 61a to cause the air A to flow near the second calcium reaction chamber 41b and the second iron reaction chamber 43b in which the exothermic reactions progress.

Meanwhile, in the second phase in which the exothermic reactions progress in the first calcium reaction chamber 41a and the first iron reaction chamber 43a adjacent thereto, of the second hydrogen-generating unit, the heat exchange flow path switching valve 57 on the exhaust gas heat exchange path 53 is switched to the side of the second exothermic reaction side compressed air preheating path 61b to cause the exhaust gas EG to flow near the second calcium reaction chamber 41b and the second iron reaction chamber 43b, and the compressed air preheating path switching valve 65 on the compressed air preheating path 61 is switched to the side of the exothermic reaction side compressed air preheating path 61b to cause the air A to flow near the first calcium reaction chamber 41a and the first iron reaction chamber 43a.

In either case, the heat of the high-temperature exhaust gas EG passing through the first endothermic reaction side heat exchange path 53a or the second endothermic reaction side heat exchange path 53b which forms a part of the exhaust gas heat exchange path 53 is supplied to the endothermic reaction region Ren to accelerate the endothermic reactions. Meanwhile, the heat generated in the exothermic reaction region Rex preheats the air A passing through the first exothermic reaction side compressed air preheating path 61a or the second exothermic reaction side compressed air preheating path 61b. Thereafter, the exhaust gas EG having passed through the second hydrogen-generating unit 33 is supplied as a heating medium to the regenerator 13. The air A having passed through the second hydrogen-generating unit 33 is supplied as a medium to be heated to the regenerator 13.

As described above, in the power generation system S according to the present embodiment, the exhaust gas heat exchange path 53 which causes the exhaust gas EG and the pyrolysis hydrogen-generating unit to exchange heat therebetween is provided with a mechanism to switch a flow path in response to interchanging of the reaction chambers which form the endothermic reaction region Ren with the reaction chambers which form the exothermic reaction region Rex, in the second hydrogen-generating unit 33 which is the pyrolysis hydrogen-generating unit, such that the flow path extends near the endothermic reaction region Ren. In the example of the present embodiment, this flow path switching mechanism is the paths 53a and 53b at the endothermic reaction side and the switching valve 57 which switches these paths. The compressed air preheating path 61 which causes the air A and the pyrolysis hydrogen-generating unit to exchange heat therebetween is provided with a mechanism to switch a flow path in response to interchanging of the reaction chambers which form the endothermic reaction region with the reaction chambers which form the exothermic reaction region, in the second hydrogen-generating unit 33 which is the pyrolysis hydrogen-generating unit, such that the flow path extends near the exothermic reaction region Rex. In the example of the present embodiment, this flow path switching mechanism is the paths 61a and 61b at the exothermic reaction side and the switching valve 65 which switches these paths. Therefore, it is possible to improve the efficiency of the entire system by effectively utilizing the heat of the exhaust gas EG and the heat generated by the pyrolysis reaction.

During a period of time when a power demand is high, generation of hydrogen by the first and second hydrogen-generating units is stopped, and an amount of generated power is increased by utilizing hydrogen stored in the hydrogen fuel reservoir 21. At that time, the exhaust gas flow path switching valve 55 is switched to the side of the exhaust gas path 51 to supply the exhaust gas EG as a heating medium directly to the regenerator 13. In addition, the compressed air flow path switching valve 63 is switched to the side of the compressed air supply path 11 to supply the compressed air A as a medium to be heated directly to the regenerator 13. It should be noted that in the case where an amount of insolation is very small, such as during the nighttime or when the weather is bad, the air A may be supplied from the regenerator 13 via the bypass path 27 directly to the hydrogen combustor 5, and heating (burning) may be performed only with the hydrogen combustor 5.

It should be noted that the water decomposition process used in the second hydrogen-generating unit, which is the pyrolysis hydrogen-generating unit, is not limited to the UT-3 process, and, for example, an IS process (Iodine-Sulfur process) may be utilized as the water decomposition process. The IS process is composed of three reactions, that is, (1) a reaction in which sulfur dioxide gas is absorbed by a mixture of water and iodine at a temperature of about 100° C. to obtain hydrogen iodide and sulfuric acid, (2) a reaction in which pyrolysis of hydrogen iodide is performed at a temperature of 400° C. to 500° C. to generate hydrogen, and (3) a reaction in which sulfuric acid is decomposed at a temperature of about 850° C. to generate oxygen. The reaction (3) is an endothermic reaction, and the reaction (1) is an exothermic reaction. Therefore, in the case of utilizing the IS process as well, preferably, in the second hydrogen-generating unit which is the pyrolysis hydrogen-generating unit, in response to interchanging of the reaction chambers which form the endothermic reaction region with the reaction chambers which form the exothermic reaction region, the exhaust gas heat exchange path which causes the exhaust gas EG and the pyrolysis hydrogen-generating unit to exchange heat therebetween is provided with a mechanism to switch a flow path such that the flow path extends near the endothermic reaction region, and the compressed air preheating path which causes the compressed air A and the pyrolysis hydrogen-generating unit to exchange heat therebetween is provided with a mechanism to switch a flow path such that the flow path extends near the exothermic reaction region.

Even when any pyrolysis process is utilized, the pyrolysis for hydrogen such as the UT-3 process and the IS process requires a high temperature of 750° C. or higher. Thus, as a gas turbine cycle, a regenerative cycle with a low pressure ratio which can handle this is selected, and a gas turbine cycle suited for an individual pyrolysis process to be used is selected. In addition, of the pyrolysis reactions for hydrogen, hydrogen separation which is an endothermic reaction and oxygen separation which is an exothermic reaction may be conducted simultaneously, or a heat storage function may be provided by increasing a medium amount for the reactions, and the reactions may be conducted during different periods of time.

In addition, either one of the first and second hydrogen-generating units 25 and 33 may be omitted. For example, the second hydrogen-generating unit 33, which is the pyrolysis hydrogen-generating unit, may be omitted, and hydrogen which is a fuel for the hydrogen combustor 5 may be generated and supplied only by the first hydrogen-generating unit, which is the electrolysis hydrogen-generating unit. In this case as well, it is possible to perform power supply corresponding to an increase or decrease in power demand by effectively utilizing surplus power generated when an amount of insolation is large with respect to power demand.

As described above, in the power generation system S according to the present embodiment, when an amount of insolation is large and a power demand is low, hydrogen is generated by the hydrogen-generating unit and stored, and when a power demand is high, an amount of supplied power can be increased by utilizing the hydrogen that has been stored. Thus, it is possible to perform power supply corresponding to an increase or decrease in power demand while utilizing sunlight as a heat source.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Compressor
3 . . . Solar heater
5 . . . Hydrogen combustor
7 . . . Turbine
9 . . . Power generator
25 . . . First hydrogen-generating unit
33 . . . Second hydrogen-generating unit
A . . . Air
S . . . Gas turbine power generation system

What is claimed is:

1. A power generation system having a gas turbine engine that utilizes sunlight, the power generation system comprising:
a compressor configured to compress an air which is a working medium;
a solar heater configured to heat the air compressed by the compressor, utilizing sunlight as a heat source;
a hydrogen combustor configured to burn the air compressed by the compressor, utilizing hydrogen as a fuel;
a turbine configured to output a motive power from a high-temperature gas heated by at least one of the solar heater and the hydrogen combustor;
a power generator configured to be driven by the turbine; and
at least one hydrogen-generating unit configured to generate hydrogen by decomposing a water, and supply the hydrogen so generated to the hydrogen combustor,
wherein the at least one hydrogen-generating unit is an electrolysis hydrogen-generating unit configured to perform the decomposing of the water by performing electrolysis of the water utilizing power generated by driving the power generator with the turbine,
wherein the power generation system further comprises:
a pyrolysis hydrogen-generating unit configured to generate hydrogen by utilizing an exhaust gas from the turbine to pyrolyze a water; and
a compressed air preheating path configured to preheat the air compressed by the compressor, utilizing a heat generated in the pyrolysis hydrogen-generating unit.

2. The power generation system as claimed in claim 1, wherein the compressed air preheating path is provided with a mechanism to switch a flow path thereof in response to interchanging of a reaction chamber in which an endothermic reaction is conducted with a reaction chamber in which an exothermic reaction is conducted in the pyrolysis hydrogen-generating unit, such that the flow path extends near the reaction chamber in which the exothermic reaction is conducted.

3. The power generation system as claimed in claim 1, further comprising an exhaust gas heat exchange path configured to cause the exhaust gas from the turbine to pass therethrough to exchange heat between the exhaust gas and the pyrolysis hydrogen-generating unit,
    wherein the exhaust gas heat exchange path is provided with a mechanism to switch a flow path thereof in response to interchanging of a reaction chamber in which an endothermic reaction is conducted with a reaction chamber in which an exothermic reaction is conducted in the pyrolysis hydrogen-generating unit, such that the flow path extends near the reaction chamber in which the endothermic reaction is conducted.

\* \* \* \* \*